US008689053B2

(12) United States Patent
Kumar et al.

(10) Patent No.: US 8,689,053 B2
(45) Date of Patent: Apr. 1, 2014

(54) SYSTEM AND METHOD FOR TESTING A SOFTWARE ENGINE INCLUDING A TEST SUBSYSTEM SIMULATING OUTPUT FOR A BASE SYSTEM IN A TEST MODE

(75) Inventors: Balaji Kumar, Irving, TX (US); Yogesh Sawhney, Irving, TX (US); Anne L. Miller, Salem, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 786 days.

(21) Appl. No.: 11/960,336

(22) Filed: Dec. 19, 2007

(65) Prior Publication Data

US 2009/0164847 A1    Jun. 25, 2009

(51) Int. Cl.
*G06F 11/00* (2006.01)
*G06F 11/22* (2006.01)

(52) U.S. Cl.
USPC ............. 714/43; 714/33; 370/216; 455/67.11

(58) Field of Classification Search
USPC ........ 714/32, 33, 46, 51, 3, 43; 370/216, 241; 455/67.11, 67.14, 67.7
See application file for complete search history.

(56) References Cited

U.S. PATENT DOCUMENTS

| | | | |
|---|---|---|---|
| 6,434,364 B1 * | 8/2002 | O'Riordain ................. 455/67.11 |
| 6,889,160 B2 * | 5/2005 | Sabiers et al. ................. 702/122 |
| 6,950,968 B1 * | 9/2005 | Parolari et al. .................. 714/43 |
| 7,143,310 B2 * | 11/2006 | Gavish et al. .................... 714/25 |
| 7,206,549 B2 * | 4/2007 | Lin et al. ..................... 455/67.11 |
| 7,623,856 B2 * | 11/2009 | Azuma .......................... 455/425 |
| 7,653,729 B2 * | 1/2010 | Mihira .......................... 709/226 |
| 7,688,754 B2 * | 3/2010 | Williams ....................... 370/253 |
| 8,260,286 B2 * | 9/2012 | Vikstedt et al. ............... 455/423 |
| 2002/0091969 A1 * | 7/2002 | Chen et al. ....................... 714/43 |
| 2006/0187848 A1 * | 8/2006 | Zaniolo et al. ................ 370/252 |
| 2007/0002753 A1 * | 1/2007 | Bailey ........................... 370/241 |
| 2008/0026748 A1 * | 1/2008 | Alexander et al. ......... 455/432.1 |
| 2008/0049623 A1 * | 2/2008 | Qiu et al. ....................... 370/241 |

* cited by examiner

*Primary Examiner* — Joseph Schell

(57) ABSTRACT

A software engine has a base system in communication with service subsystems and test subsystems. The base system, the service subsystems, and the test subsystems are software applications that exchange data with one another while operating within the software engine. In one exemplary mode of operation, the base system receives outputs from the service subsystems. In another exemplary mode of operation, the base system receives outputs from the test subsystems that simulate the outputs generated by the service subsystems. An exemplary method of testing the software engine is also provided. Specifically, the illustrative method includes receiving an output during a service mode, switching from the service mode to a testing mode, and receiving the simulated output during the testing mode. The method steps may be performed by a computer executing instructions stored on a computer-readable medium.

20 Claims, 2 Drawing Sheets

SYSTEM AND METHOD FOR TESTING A SOFTWARE ENGINE INCLUDING A TEST SUBSYSTEM SIMULATING OUTPUT FOR A BASE SYSTEM IN A TEST MODE

BACKGROUND INFORMATION

A software engine is a collection of software applications communicating with one another over a network. Distributed computer systems include several software engines operating on different computers. Generally, each software engine includes at least one base system in communication with one or more subsystems. The base system and subsystems are software applications that exchange information with one another, and each may be stored on a different computer at remote locations. Any industry having a distributed computer architecture may benefit from such a system.

Distributed computer systems undergo frequent testing to ensure proper operation of the base system and subsystems. Proper operation of the base system depends on proper reception and interpretation of the signals output by each of the subsystems. In addition, one of the subsystems may output to other subsystems. Therefore, proper operation of one subsystem may depend upon the proper reception and interpretation of signals output by another of the subsystems. During testing, a tester may examine how the base system and other subsystems respond when one of the subsystems fails. However, it takes a great deal of coordination to properly perform the test. In some situations, the tester must cause one or more of the subsystems to fail while trying to monitor the results at the base system and the other subsystems. The difficulty in testing the software engine increases as the complexity of the software engine increases.

Accordingly, a software engine is needed that allows the tester better coordinate the testing of the base system and the subsystems.

DETAILED DESCRIPTION

An exemplary software engine has a base system in communication with at least one service subsystem and at least one test subsystem. The base system, the service subsystems, and the test subsystems are software applications that exchange data with one another while operating within the software engine. The base system may have at least two modes: a service mode and a testing mode. During the service mode, the base system receives outputs from the service subsystems, and during the testing mode, the base system receives outputs from the test subsystems. The outputs generated by the test subsystems simulate the outputs generated by the service subsystems. The test subsystems may be controlled by a tester using a user interface without having to coordinate the outputs of each of the service subsystems. Accordingly, the software engine may be used to test any distributed computer architecture system.

An exemplary method of testing the software engine may include receiving an output during the service mode, switching from the service mode to the testing mode, and receiving the simulated output during the testing mode. The method steps may be performed by a computer executing instructions stored on a computer-readable medium.

Figure 1:
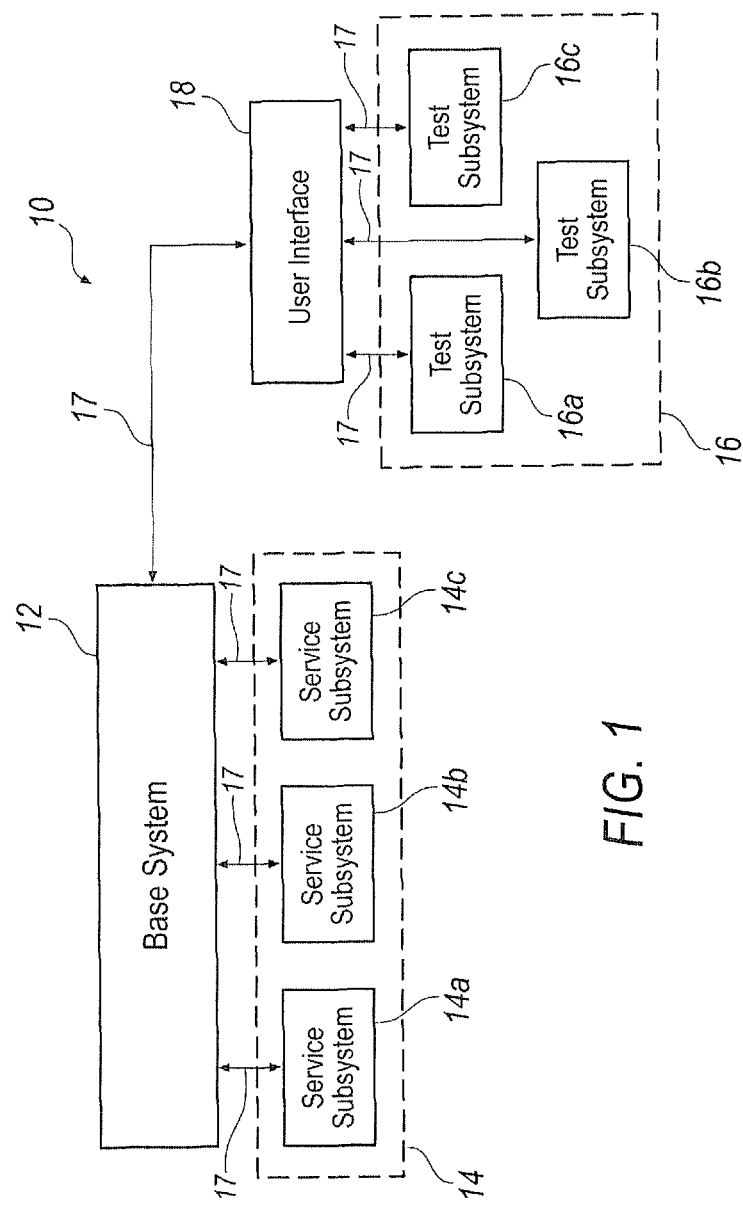
FIG. 1 illustrates a signal flow diagram of a software engine having a base system in communication with a plurality of service subsystems and test subsystems.

Referring to FIG. 1, an exemplary software engine 10 is disclosed that includes a base system 12 in communication with at least one service subsystem 14 and at least one test subsystem 16 via a network 17. The network 17 may be a distribution network, such as is known. For example, the network 17 may include hardware and software for transmitting data via a coaxial cable and/or a fiber optic cable, or wirelessly. The network 17 may also be a packet switched network, which is generally an internet protocol (IP) network that utilizes known protocols found generally within the internet protocol suite. Further, the network 17 may include a variety of networks such as a wide area network (WAN), e.g., the Internet, a local area network (LAN), a fiber-optic network, etc. As is known, the network 17 may be used to transport a variety of data, including multimedia data, such as audio and video. In an IPTV media distribution system, the network 17 is typically a packet switched network. In a switched-video media distribution system, network 17 is typically an RF-based distribution network, such as common cable television networks, that allows for two-way communication over the network 17 between the base system 12, the service subsystems 14, and the test subsystems.

The base system 12, the service subsystems 14, and the test subsystems 16 are software applications that exchange data with one another while operating within the software engine 10. In one exemplary approach, the service subsystems 14 and the test subsystems 16 output signals to the base system 12 and other service subsystems 14 and/or test subsystems 16. Therefore, for example, at least one of the service subsystems 14 may exchange data with another of the service subsystems 14. Likewise, at least one of the test subsystems 16 may exchange data with at least one of the service subsystems 14 or other test subsystems 16.

As software applications, each of the base system 12, the service subsystems 14, and the test subsystems 16 may be stored in a computer-readable medium and executed by at least one computer. A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The base system 12 may operate in at least two modes: a service mode and a testing mode. During the service mode, the base system 12 receives data that is output by the service subsystems 14. During the testing mode, the base system 12 receives data that is output by the test subsystems 16. The test subsystems 16 are configured to simulate the outputs from the service subsystems 14. The data in the simulated outputs may include data that may be identical or nearly identical to the outputs by the service subsystems 14. For example, the simulated outputs transmitted by the test subsystems 16 may be so identical to the original outputs transmitted by the service subsystems 14 that the base system 12 is unable to distinguish between the simulated outputs and the original outputs. In an alternative example, the simulated outputs may indicate to the base system 12 that the output is simulated. For instance, the simulated output may include a signal from the test subsystems 16 identifying the signal as originating from one of the test subsystems 16. The simulated outputs may be preloaded into each of the test subsystems 16. For example, the test subsystems 16 may store several different simulated outputs, and may be configured to transmit one or more of the simulated outputs in a desired sequence, which is discussed in greater detail below.

Each of the test subsystems 16 may be configured to simulate an output from one of the service subsystems 14. For instance, test subsystem 16A may be configured to simulate the output from service subsystem 14A, test subsystem 16B may be configured to simulate the output from service subsystem 14B, and test subsystem 16C may be configured to simulate the output from service subsystem 14C. In an alternative exemplary approach, one of the test subsystems 16 may be configured to simulate the outputs of more than one service subsystem 14. For instance, test subsystem 16A may be configured to simulate the output from service subsystem 14A, service subsystem 14B, and service subsystem 14C. The base system 12 may be configured to only receive the outputs from the service subsystems 14 during the service mode. Likewise, the base system 12 may be configured to only receive the outputs from the test subsystems 16 during the testing mode. Alternatively, the base system 12 may be configured to receive specific outputs from one or more of the service subsystems 14 and specific outputs from one or more of the test subsystems 16 during the testing mode.

The software engine 10 may further include a user interface 18 in communication with the base system 12 and test subsystems 16. The user interface 18 is a software application operating within the software engine 10 that allows a person, such as a software engine tester, to interact with the software engine 10. Similar to the base system 12, the service subsystems 14, and the test subsystems 16, the user interface 18 may be stored in a computer-readable medium and executed by at least one computer.

The user interface 18 may be configured to toggle the base system 12 between the service mode and the testing mode. When in the service mode, the user interface 18 may allow communication between the base system 12 and the service subsystems 14 by preventing the outputs from the test subsystems 16 from reaching the base system 12. In one exemplary approach, the user interface 18 may disable the test subsystems 16. In another exemplary approach, the user interface 18 may instruct the base system 12 to ignore the signals output by the test subsystems 16. When in the testing mode, the user interface 18 may prevent the outputs from the service subsystems 14 from reaching the base system 12. For instance, the user interface 18 may electronically instruct the base system 12 to ignore the outputs from the service subsystems 14. Alternatively, the user interface 18 may be in communication with the service subsystems 14 and disable the service subsystems 14 to prevent the service subsystems 14 from outputting data to the base system 12. In another alternative, the service subsystems 14 may be disconnected from the base system 12 independently of the software engine 10. For instance, the tester may physically disconnect the service subsystems 14 from the base system 12. However, with the user interface 18, it is to be appreciated that the service subsystems 14 or the test subsystems 16 need not be physically disconnected from the base system 12. In addition, during the testing mode, in one exemplary approach, the user interface 18 may allow the tester to select one or more simulated outputs to transmit to the base system 12. Also, in another exemplary approach, the user interface 18 may allow the tester to select an order in which to transmit the simulated outputs.

Figure 2:
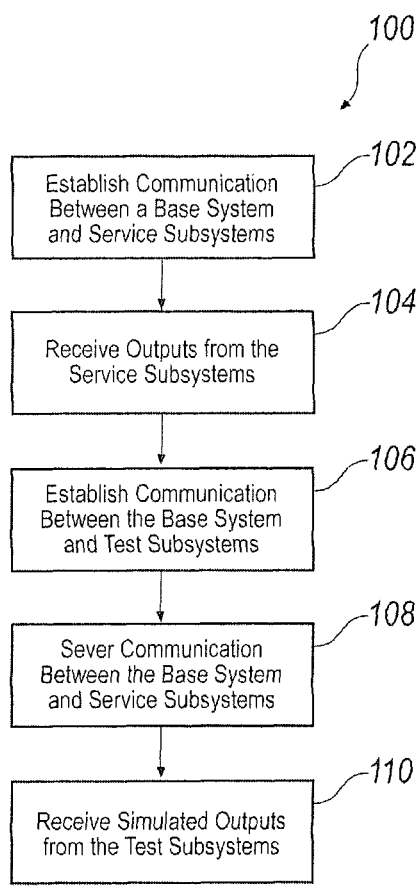
FIG. 2 illustrates a flowchart of a method of testing the software engine.

FIG. 2 illustrates an exemplary method 100 of testing the software engine 10. The method 100 includes a step 102 of establishing communication between the base system 12 and the service subsystems 14. As previously discussed, in one exemplary approach, the base system 12 and the service subsystems 14 are software applications and are in communication through any known software communication protocol. Once communication has been established, the base system 12 may receive outputs from the service subsystems 14. Accordingly, the method 100 further includes a step 104 of receiving the outputs generated by the service subsystems 14. As previously discussed, the outputs are received at the base system 12 via the network. In addition, the method 100 includes switching from the service mode to a testing mode, which may include a step 106 of establishing communication between the base system 12 and the test subsystems 16, and a step 108 of severing communication between the base system 12 and the service subsystems 14. As previously discussed, communication between the base system 12 and the test subsystems 16 may be established with the user interface 18. Similarly, communication between the base system 12 and the service subsystems 14 is severed with the user interface 18. As previously discussed, severing the communication between the base system 12 and the service subsystems 14 need not require physically disconnecting the service subsystems 14 from the base system 12. Instead, the user interface 18 may either block outputs from the service subsystems 14 or instruct the base system 12 to ignore outputs from the service subsystems 14. In some exemplary approaches, the step 106 of establishing communication between the base system 12 and the test subsystems 16 may be at least near simultaneous with the step 108 of severing communication between the base system 12 and the service subsystems 14. The exemplary method 100 further includes a step 110 of receiving the simulated outputs during the testing mode. Specifically, the base system 12 receives the simulated outputs generated by the test subsystems 16. As previously discussed, the outputs generated by each of the test subsystems 16 simulate at least one of the outputs of the service subsystems 14. The exemplary method 100 illustrated in FIG. 2 may be generally tangibly embodied as one or more sets of computer-executable instructions stored on a computer readable medium. Such computer readable-medium may be included in or associated with one or more computing devices, although such devices are not illustrated in the Figures. The method 100 may be generally executed within one or more such computing devices.

Figure 3:
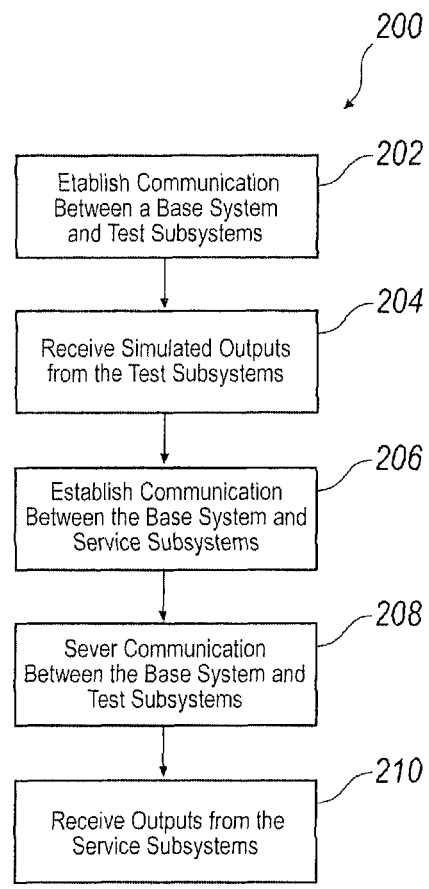
FIG. 3 illustrates a flowchart of a method of returning the software engine to a service mode.

FIG. 3 illustrates an exemplary method 200 of switching the software engine 10 from the testing mode to service mode. The method 200 includes a step 202 of establishing communication between the base system 12 and the test subsystems 16, and a step 204 of receiving the simulated outputs during the testing mode. As previously discussed, in one exemplary approach, the base system 12 and the test subsystems 16 are software applications and are in communication through any known communication protocol. The method 200 further includes a step 206 of establishing communication between the base system 12 and the service subsystems 14, and a step 208 of severing communication between the base system 12 and the test subsystems 16. Communication between the base system 12 and the service subsystems 14 is established with the user interface 18. Similarly, communication between the base system 12 and the test subsystems 16 is severed with the user interface 18. As previously discussed, severing the communication between the base system 12 and the test subsystems 16 need not require physically disconnecting the test subsystems 16 from the base system 12. Instead, the user interface 18 may either block outputs from the service subsystems 14 or instruct the base system 12 to ignore outputs from the service subsystems 14. In some illustrative approaches, the step 206 of establishing communication between the base system 12 and the service subsystems 14 may be at least near simultaneous with the step 208 of severing communication between the base system 12 and the test subsystems 16. The illustrative method 200 further includes a step 210 of receiving the outputs generated by the service subsystems 14, and the outputs are received at the base system 12 via the network. It is to be appreciated that the exemplary method 200 illustrated in FIG. 3 may be generally tangibly embodied as one or more sets of computer-executable instructions stored on a computer readable medium. Such computer readable-medium may be included in or associated with one or more computing devices, although such devices are not illustrated in the Figures. The method 200 may be generally executed within one or more such computing devices.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a" "the," "said," etc. should be read to recite one or more of the indicated elements unless a claim recites explicitly to the contrary.

What is claimed is:

1. A software engine including at least one software application stored in a non-volatile medium, comprising:
a base system having at least both a service mode and a testing mode;
at least one of a plurality of service subsystems in communication with said base system during said service mode, wherein said base system is configured to receive a service output from at least one of said service subsystems during said service mode; and
at least one test subsystem in communication with, during said testing mode, said base system and at least one of said service subsystems, and wherein said at least one test subsystem is configured to simulate a test output from a respective one of said service subsystems during said testing mode, said at least one test subsystem being distinct from said service subsystems, wherein the base system is configured to switch between said service mode and said testing mode and receive said service output in said service mode and said test output based in said testing mode, wherein the test output indicates to the base system that the test output is simulated.

2. A software engine as set forth in claim 1, further comprising a user interface in communication with said base system and said at least one test subsystem, wherein said user interface is configured to switch said base system between said service mode and said testing mode.

3. A software engine as set forth in claim 2, wherein said user interface instructs said base system to ignore outputs from at least one of said service subsystems.

4. A software engine as set forth in claim 2, wherein said user interface is in communication with at least one of said service subsystems and disables said at least one service subsystem in response to receiving an output from said at least one test subsystem.

5. A software engine as set forth in claim 1, wherein at least one of said service subsystems is in communication with another of said service subsystems.

6. A software engine as set forth in claim 1, wherein said at least one test subsystem is in communication with another test subsystem in response to said base system being in said testing mode.

7. A software engine as set forth in claim 1, wherein the output from the respective one of said service subsystems is simulated without coordinating with outputs from any other of said service subsystems.

8. A software engine as set forth in claim 1, wherein said test output is sufficiently similar to said service output such that the base system is unable to distinguish between the test output and service output.

9. A software engine as set forth in claim 1, wherein the test output is preloaded into said at least one test subsystem and configured to transmit a plurality of test outputs in a predefined sequence.

10. A method comprising:
establishing communication between a base system and at least one of a plurality of service subsystems;
receiving at least one service output from at least one of the service subsystems during a service mode;
switching from said service mode to a testing mode by establishing communication between the base system and at least one test subsystem, wherein the at least one test subsystem is in communication with a respective one of the service subsystems in the testing mode; and
receiving at least one simulated output from the at least one test subsystem, the at least one test subsystem being distinct from the service subsystems, wherein the at least one simulated output indicates to the base system that the at least one simulated output is simulated.

11. A method as set forth in claim 10, further including severing communication between the base system and at least one of the service subsystems prior to receiving the at least one simulated output from the at least one test subsystem.

12. A method as set forth in claim 10, further including severing communication between the base system and the at least one test subsystem prior to re-commencing the receiving of the at least one service output from at least one of the service subsystems during the service mode.

13. A method as set forth in claim 10, wherein receiving at least one service output from at least one of the service subsystems includes receiving at least one output from the at least one service subsystem at the base system.

14. A method as set forth in claim 10, wherein receiving at least one simulated output from the at least one test subsystem includes receiving at least one simulated output from the at least one test subsystem at the base system.

15. A method as set forth in claim 10, wherein receiving at least one simulated output from the at least one test subsystem is simultaneous with receiving at least one service output from at least one of the service subsystems.

16. A method as set forth in claim 15, wherein one of the at least one test subsystem is associated with a respective one of the at least one service subsystems, and further wherein receiving at least one simulated output from the one of the at least one test subsystem is simultaneous with receiving at least one service output from another one of the at least one of the service subsystems not associated with the respective one of the at least one test subsystem.

17. A method as set forth in claim 10, wherein receiving at least one simulated output from the at least one test subsystem is sequential to receiving at least one service output from at least one of the service subsystems.

18. A method as set forth in claim 10, wherein receiving at least one simulated output from the at least one test subsystem includes configuring the at least one test subsystem to simulate at least one output from at least one of the service subsystems.

19. A method as set forth in claim 10, wherein the method is performed by a computer executing instructions stored in a computer-readable medium.

20. A software engine including at least one software application stored in a non-volatile medium, comprising:
    a base system having at least both a service mode and a testing mode;
    at least one of a plurality of service subsystems in communication with said base system during said service mode, wherein said base system is configured to receive a service output from at least one of said service subsystems during said service mode; and
    at least one test subsystem in communication with, during said testing mode, said base system and at least one of said service subsystems, and wherein said at least one test subsystem is configured to simulate a test output from a respective one of said service subsystems during said testing mode, said at least one test subsystem being distinct from said service subsystems, wherein the base system is configured to switch between said service mode and said testing mode and receive said service output in said service mode and said test output based in said testing mode, wherein said at least one test subsystem is in communication with another test subsystem in response to said base system being in said testing mode.

* * * * *